United States Patent
Charky et al.

(10) Patent No.: US 7,150,062 B2
(45) Date of Patent: Dec. 19, 2006

(54) COMBINED SINGLE-TWIN STREET SWEEPING MACHINE

(75) Inventors: Gabriel Charky, Chino, CA (US); Anthony Duthie, Chino, CA (US)

(73) Assignee: Allianz Madvac, Inc., Bocherville (CA)

(*) Notice: Subject to any disclaimer, the term of this patent is extended or adjusted under 35 U.S.C. 154(b) by 504 days.

(21) Appl. No.: 10/761,445

(22) Filed: Jan. 21, 2004

(65) Prior Publication Data

US 2005/0155170 A1 Jul. 21, 2005

(51) Int. Cl.
*E01H 1/02* (2006.01)
(52) U.S. Cl. ......................................................... 15/78
(58) Field of Classification Search .................. 15/78, 15/82, 83, 87; 180/53.1, 306
See application file for complete search history.

(56) References Cited

U.S. PATENT DOCUMENTS 3,854,160 A * 12/1974 Hildebrand et al. ............ 15/84
5,077,920 A * 1/1992 Farrell .......................... 37/247

* cited by examiner

*Primary Examiner*—David Redding
(74) *Attorney, Agent, or Firm*—Staas & Halsey LLP

(57) ABSTRACT

A surface cleaning vehicle is provided with hydraulically driven sweeping machinery. The vehicle comprises a truck chassis for carrying the sweeping machinery and a prime mover engine for propelling the vehicle. A second engine is connected to said chassis, and first and second pumps and associated check valves are connected to respective ones of the prime mover and second engines for driving said sweeping machinery. A control mechanism is provided for selectively connecting only one of the prime mover engine or second engine to drive the sweeping machinery.

14 Claims, 4 Drawing Sheets

COMBINED SINGLE-TWIN STREET SWEEPING MACHINE

BACKGROUND OF THE INVENTION

1. Field of the Invention

The present invention is directed to surface cleaning vehicles, and more particularly to a combined single and twin power system for independently driving sweeping machinery of a surface cleaning vehicle.

2. Description of the Related Art

Street cleaning vehicles are well known in the art having mechanical conveying systems, either in the form of a conveyor elevator that drags collected debris up an inclined ramp or via an inclined conveyor belt. The discharge from the conveyor is deposited into a hopper that is provided with a tipping mechanism for discharge.

Street cleaning vehicles employing pneumatic conveying systems are also well known in the art, and fall into two categories, vacuum and regenerative. Both categories of machine employ an exhauster fan to induce high velocity airflow for conveying the debris through a conduit. Regenerative machines additionally utilize the exhauster fan to aid the collection system, whereas vacuum machines do not.

In general, pneumatic conveying systems have a much greater power requirement, as compared to mechanical conveyors, as a result of using the exhauster fan to perform the debris collection and conveying functions. The power requirement for driving the brooms is similar for both types of machines.

The conveying system may be driven either by the prim mover engine used to propel the vehicle—referred to herein as 'Single', or by utilizing a separate engine—referred to herein as 'Twin'.

Single mechanical machines utilize the vehicle's prime moving engine to drive the sweeping mechanisms. More particularly, the sweeping and conveying equipment is hydraulically driven by a pump or pumps coupled to the prime mover engine via a disconnectable power-take-off. The engine and transmission forming part of the carrier vehicle, require little or no change to the driveline and produce sufficient power for the sweeping mechanisms when running at low engine speeds that occur when driving the vehicle slowly, for example at less than 5 MPH (8 km/h). The single machine design enjoys the perception of simplicity in terms of construction and operation. The only criterion of the single design is that, at low speeds, the prime mover engine provides sufficient power to drive the sweeping equipment and perform effectively (i.e. when the vehicle is being driven slowly. Machines of the 'single' type have been to be best suited to municipal operations associated with lighter duty street cleaning operations where the machine provides adequate performance (e.g. 40 to 50 Horsepower (30 to 40 kilowatts)) at low operating costs.

Pneumatic machines often incorporate the aforenoted second engine, or 'twin' configuration, to drive the sweeping equipment. More particularly, the sweeping and conveying equipment is driven by a mechanical transmission or by a fluid power mechanism powered by a pump or pumps coupled to the second engine. Although there are examples of single engine pneumatic machines, these machines employ auxiliary driveline systems using hydrostatics and/or mechanical gearboxes to enable power to be extracted from the engine at higher speeds whilst maintaining slow sweeping speeds. These modifications greatly increase the cost and complexity of the machine. Moreover, a prime-mover engine of higher than usual power is often required, which tends to further increase the initial cost.

In general, the driveline configuration requirements of the carrier vehicle for a 'mechanical' machine are similar to those of a normal commercial transport vehicle with automatic transmission. The vehicle specifications are similar for both the single and twin designs.

The twin design offers more flexibility than the single design in terms of operating modes, since there are no requirements of the prime-mover engine in terms of power or speeds. The sweeping and conveying functions operate independently of how the vehicle is driven, which vary according to the conditions of work (i.e. stop, start, forward, reverse, slow, fast, etc.). By using a second engine, it is possible to design a twin machine with higher sweeping and conveying performance on a given type of vehicle than would be possible with a similar power rating of prime mover engine of single machine design. The flexibility in operation and corresponding sweeping performance are the major advantages of the twin design. These advantages make the twin design best suited to duties associated with industrial activities, road construction and where heavier duty sweeping conditions prevail. The disadvantages are that the machine incurs additional operational costs for fuel and maintenance and there is a perception of increased complexity over single machine design, as a result of using two engines.

SUMMARY OF THE INVENTION

It is an aspect of the present invention to provide a combined single and twin power system for independently driving sweeping machinery of a surface cleaning vehicle. According to the invention, both the single and twin designs are combined into one machine with a selectable mode of operation. The benefit to the operator is the ability to work in the lower cost single mode for most of the time, with the option to switch to twin mode for heavy-duty sweeping tasks (e.g. seasonal tasks such as spring cleanup following winter gritting, or in emergency situations).

Preferably, an hour and distance counter is provided to record the operation when working in either single or twin mode. This allows a contractor to use a variable scale of charges according to the type of work and conditions contracted to.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
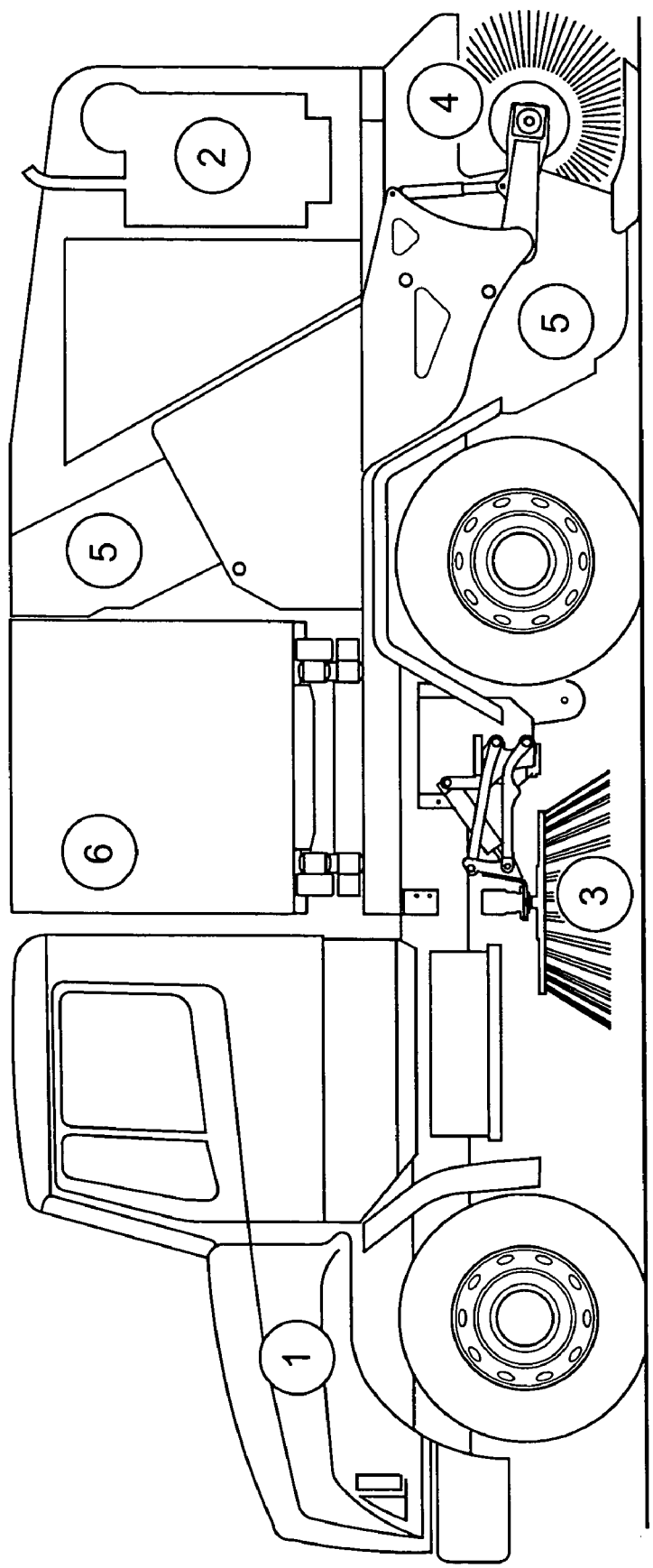
FIG. 1 is an elevation view of a surface cleaning vehicle having a mechanical sweeping apparatus operable in single and twin operating modes, according to a preferred embodiment of the invention.

As shown in FIG. 1, a base vehicle is provided with a commercially available truck chassis 1 with prime-mover engine. According to the preferred embodiment, a truck is provided having a gross vehicle mass of nominally 15000 kilograms, a prime mover engine of greater than 175 Horsepower (130 kilowatts) at 2200 rpm, and a torque converter coupling between the engine and transmission. Automatic transmission is provided which, when coupled with the rear axle ratio, allows the vehicle to be driven at slow speed (e.g. 2 MPH (3 km/h)).

A second, 'twin' engine 2 is provided, having sufficient power (typically 60 Horsepower (45 kilowatts)), to drive sweeping equipment including scarifying brooms 3 and 4, and conveyor elevator 5. The debris is deposited from conveyor 5 into a hopper 6, in a well known manner.

Figure 2:
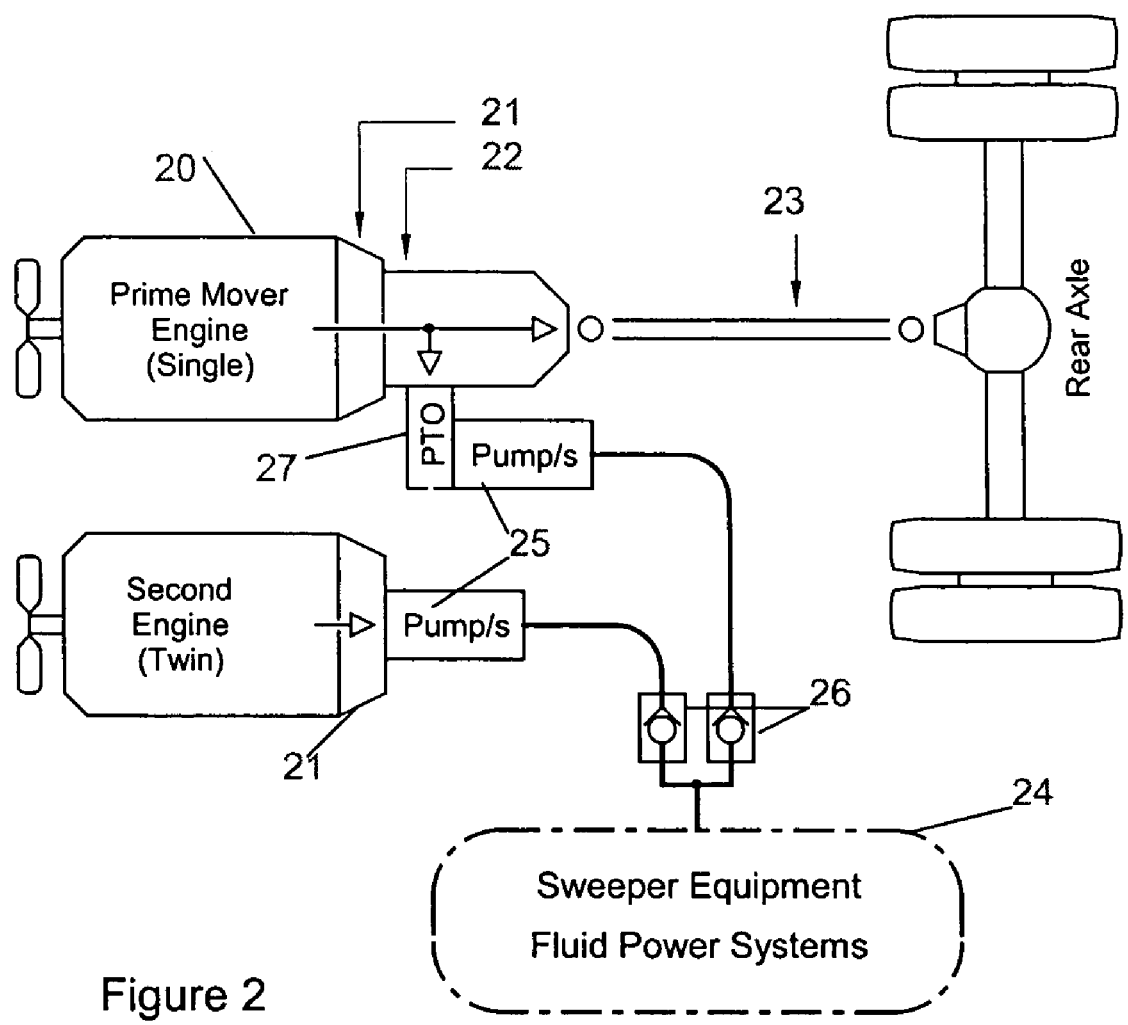
FIG. 2 is a schematic block diagram of the drivelines from the prime mover engine and from the second engine and the fluid-power link to the sweeping equipment system, for the vehicle of FIG. 1.

Referring to FIG. 2, the vehicle driveline is shown comprising a prime mover engine 20, torque converter 21 and automatic transmission 22 connected to a propeller shaft 23. The propeller shaft is connected to a rear axle for driving the rear wheels of the truck. The driveline components are connected to the main functional components of the mechanical sweeping equipment and fluid power systems 24, which are common for the single and twin operating modes. The only variance is that power to the systems 24 is provided either by the single or twin fluid power pump/s 25 via shuttle or check valves 26. The control system of FIG. 3 operates the pump/s 25, ensuring that only one pump 25 can be in operation at any particular time. As illustrated, power-take-off (PTO 27) is included, with engagement and disengagement of the PTO 27 under dynamic conditions, to power the sweeping equipment fluid power pump/s 25.

The pumps 25 in both systems can be variable displacement units with control mechanisms to deliver a uniform flow once a minimum operating speed has been met. Alternatively, the pump/s 25 coupled to the second engine can be of fixed displacement design.

Figure 3:
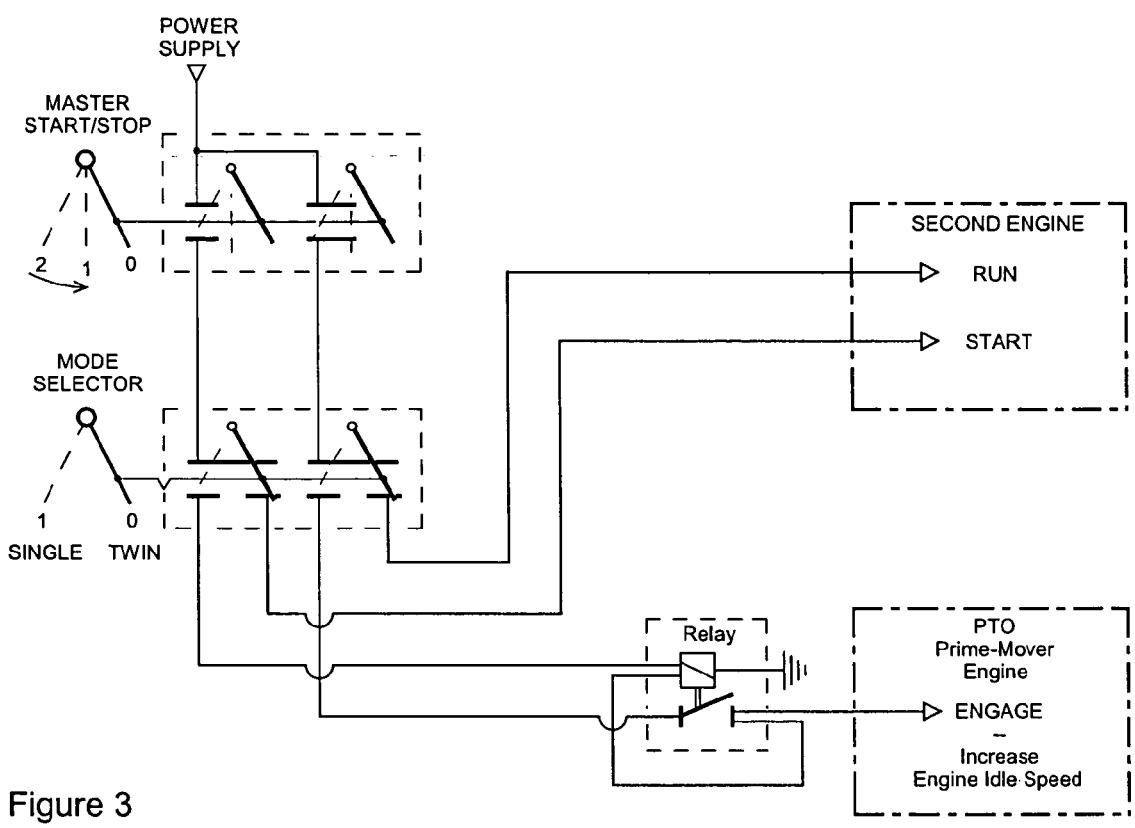
FIG. 3 is a schematic diagram of the electrical control system for discrete operation of either single or twin modes, for the vehicle of FIG. 1.

The 'single' operation component has an additional control to the prime mover engine, to increase its low idle speed to nominally 900 rpm when the PTO 27 is engaged. At this speed, the engine 20 has sufficient power to drive the pump 25 and not be prone to stalling once the accelerator foot pedal is fully relaxed. The pump is configured to deliver a predetermined flow of fluid, so that any increase in speed above this setting does not increase the fluid flow. The above-described additional control to the prime mover engine for increasing the speed function is a feature of the carrier vehicle and is offered in the supplier's specification when auxiliary equipment is to be driven. Typically an electrical connection from the sweeper control (in this case by the master stop/start switch via the mode select switch, discussed in greater detail below with reference to FIG. 3) is made to the engine's ECU (Electronic Control Unit) to effect the operation. Similarly, a parallel connection is made to engage the PTO function to drive the pump/s 25 as indicated in FIG. 3.

At the low engine speed of 900 rpm the torque converter 21 only delivers a portion of its normal torque capability. The application of the vehicle's braking system can be administered to arrest it in order to achieve very low vehicle creeping speeds or static condition when the transmission is in its lowest gear by stalling the converter 21.

In this working condition, the vehicle's speed is controlled in a similar fashion to that of a regular transport vehicle by means of an 'accelerator' foot pedal that can vary the engine speed throughout the normal speed range, or by the application of the brakes. Increasing the engine speed not only delivers more engine power but also increases the torque capacity of the converter 21 and allows the vehicle to be propelled up inclines. By employing the variable displacement pump with a control that maintains a constant flow, increasing the engine speed does not increase the fluid flow or the power requirement to drive it. Therefore, the pump 25 is capable of operating throughout the engine's entire speed range.

For the twin mode of operation, the second engine 2 and fluid power pump/s 25 are matched in terms of speed and power etc. to deliver a similar or preferably a greater fluid flow when compared to the single mode of operation. In the twin operating mode, the second engine 2 is set to run at a set speed and the vehicle may be driven in the normal fashion at any speed.

As discussed above, a feature of the present invention is that it is only possible to operate the vehicle in either the single or twin mode but not in both modes simultaneously.

FIG. 3 shows the electrical control system for operating the PTO 27 or the second engine 2. Two switches are employed: a master switch and a two position mode selector for switching between single and twin modes of operation.

The master switch has three positions (0) Off, (1) Run and (2) Second-Engine-Start or PTO engagement. For position (2) the switch is 'Hold to Run' and once released springs back to position (1). Switching from position (0) to position (1) provides power to either the engine 2 or the PTO 27 depending on the position of the selector switch. Switching to position (2) either starts the engine 2 by-way of its starter motor or engages the PTO 27 and increases the engine idle speed. A latching relay is provided to hold the PTO 27 in engagement with increased engine speed once energized. When the mode selector switch is returned to position (0), the power is severed to whichever of the engine 2 or PTO 27 is in operation at the time, and the engine 2 either shuts-down or the PTO disengages 27 accordingly.

Power to the master start/stop switch is received from the carrier vehicle power supply, once its 'ignition key' or isolation switch has been activated.

Operating the mode selector switch when one of the systems is in operation also has the same effect as shutting-down. To start-up in a new selected mode, it is necessary to reactivate the master switch to position (2).

This control feature is also extended to the condition when the carrier vehicle's ignition key is switched-off, in which case it is necessary to activate the master switch to initiate machine operation once the ignition key switch has again been switched to the 'on' position.

This re-start feature has been implemented in the design to avoid the condition of an unexpected start-up in the event that the mode selector is inadvertently disturbed, or following a situation where the vehicle's ignition key switch is turned-on and the prime mover engine started with master switch set in the run (1) position.

Whilst it may be inferred from the foregoing that application of the present invention may not be practical in pneumatic machine, there is no technical impediment to such application, although cost may be a disincentive in some circumstances. The invention is, nonetheless, equally applicable to both mechanical surface cleaning machines, as shown in FIG. 1, or pneumatic surface cleaning machines as shown in FIGS. 4 and 5.

Figure 4:
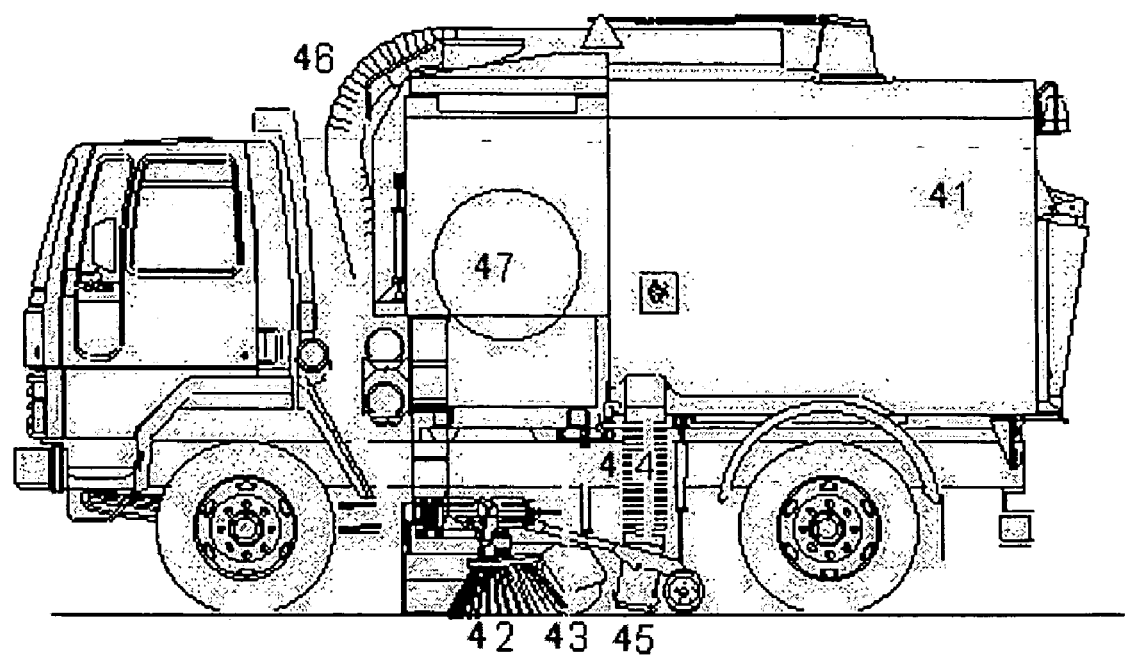
FIG. 4 is an elevation view of a surface cleaning vehicle having a pneumatic vacuum sweeping apparatus operable in combined single and twin operating modes, according to a first alternative embodiment of the invention.

FIG. 4 depicts a surface cleaning machine with vacuum-operated sweeping apparatus, according to a first alternative embodiment. A tipping hopper 41 is mounted to the truck chassis for collecting and, upon tipping, discarding collected trash. The sweeping arrangement includes a gutter broom 42 and main broom 43 for directing debris toward a pick-up nozzle 45 of a suction conveyor duct 44. A vacuum wander hose 46 is also provided, as is known in the art. A vacuum suction fan is selectively operated either in single mode, or via an auxiliary engine power unit 47 for twin mode, as discussed above in connection with FIGS. 2 and 3.

Figure 5:
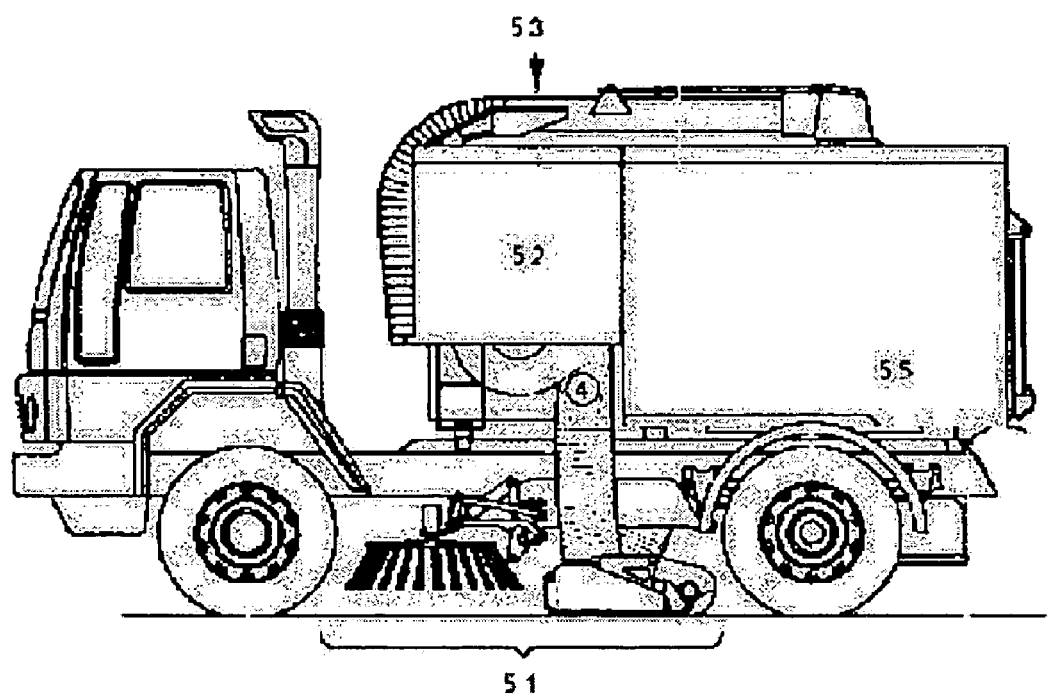
FIG. 5 is an elevation view of a surface cleaning vehicle having a pneumatic regenerative sweeping apparatus operable in combined single and twin operating modes, according to a second alternative embodiment of the invention.

FIG. 5 depicts a surface cleaning machine with regenerative air sweeping apparatus, according to a second alternative embodiment. The sweeping arrangement includes gutter brooms and pick-up head 51 selectively operated either in single mode, or via an auxiliary engine power unit 52 for twin mode, as discussed above in connection with FIGS. 2 and 3. Debris directed by the brooms and pick-up head 51 is drawn into hopper 55 via a combination blower/suction fan and air blast discharge duct 54. A vacuum wander hose 53 is also provided, as is known in the art. The tipping hopper 55 is mounted to the truck chassis for collecting and, upon tipping, discarding collected trash.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A surface cleaning vehicle with hydraulically driven sweeping machinery, comprising:
   a truck chassis for carrying said sweeping machinery and a prime mover engine for propelling said vehicle;
   a second engine connected to said chassis;
   first and second pumps and associated check/isolation valves connected to respective ones of said prime mover and second engines for driving said sweeping machinery; and
   a control mechanism for selectively connecting only one of said prime mover engine or said second engine to drive said sweeping machinery.

2. The surface cleaning vehicle of claim 1, further comprising a power-take-off unit intermediate said first pump and said prime mover engine.

3. The surface cleaning vehicle of claim 1, wherein at least one of said pumps is a variable displacement pump.

4. The surface cleaning vehicle of claim 1, wherein at least one of said pumps is a fixed displacement pump.

5. The surface cleaning vehicle of claim 2, further comprising an additional control mechanism for increasing the low idle speed of said prime mover engine when said power-take-off unit is engaged.

6. The surface cleaning vehicle of claim 2, wherein said control mechanism further comprises a master switch and a mode selector switch, said mode selector switch having a SINGLE position and a TWIN position, and said master switch having an OFF position, a START position for starting said second engine in the event said mode selector switch is in the TWIN position or engaging said power-take-off unit in the event said mode selector switch is in the SINGLE position, and a RUN position for continued operation of said second engine in the event said mode selector switch is in the TWIN position or said power-take-off unit in the event said mode selector switch is in the SINGLE position.

7. The surface cleaning vehicle of claim 6, further comprising a latching relay connected to said mode selector switch for holding the power-take-off unit in engagement in response to being energized via said mode selector switch.

8. The surface cleaning vehicle of claim 6, wherein said master switch is spring loaded such that upon being released from said START position the master switch returns to said RUN position.

9. The surface cleaning vehicle of claim 6, wherein said control mechanism includes means for disabling operation of said second engine in the event said mode selector switch is changed from the TWIN position to the SINGLE position while said second engine is running, and for disabling operation of said power-take-off unit in the event said mode selector switch is changed from the SINGLE position to the TWIN position while said power-take-off unit is running.

10. The surface cleaning vehicle of claim 6, further including a vehicle ignition switch for starting said prime mover engine and providing power to the control mechanism, such that opening said ignition switch disables operation of said sweeping machinery.

11. The surface cleaning vehicle of claim 1, wherein said hydraulically driven sweeping machinery is mechanically operated.

12. The surface cleaning vehicle of claim 1, wherein said hydraulically driven sweeping machinery is pneumatically operated.

13. The surface cleaning vehicle of claim 12, wherein said hydraulically driven sweeping machinery is pneumatically operated using vacuum.

14. The surface cleaning vehicle of claim 12, wherein said hydraulically driven sweeping machinery is pneumatically operated using regenerative air.

* * * * *